US007106586B2

(12) United States Patent
Yu et al.

(10) Patent No.: US 7,106,586 B2
(45) Date of Patent: Sep. 12, 2006

(54) COMPUTER HEAT DISSIPATING SYSTEM

(75) Inventors: Wen-Lung Yu, Taipei (TW); Ying-Chun Chou, Taipei (TW); Kun-Chih Lu, Taipei (TW)

(73) Assignee: Shutlle Inc., Taipei (TW)

( * ) Notice: Subject to any disclaimer, the term of this patent is extended or adjusted under 35 U.S.C. 154(b) by 88 days.

(21) Appl. No.: 10/934,484

(22) Filed: Sep. 7, 2004

(65) Prior Publication Data
US 2006/0050480 A1 Mar. 9, 2006

(51) Int. Cl.
*H05K 7/20* (2006.01)
(52) U.S. Cl. .................. 361/690; 361/695; 361/687; 165/122; 454/184
(58) Field of Classification Search ............... 361/687, 361/690–695, 696–697, 726, 732, 784, 801; 454/184; 312/223.2, 223.3, 107, 236, 111; 174/15.1, 16.1, 16.3; 165/80.2, 80.3, 121, 165/146, 185, 104.32, 104.33
See application file for complete search history.

(56) References Cited
U.S. PATENT DOCUMENTS

| | | | | |
|---|---|---|---|---|
| 5,505,533 A | * | 4/1996 | Kammersqard et al. | .... 312/236 |
| 5,793,608 A | * | 8/1998 | Winick et al. | ......... 361/695 |
| 5,828,549 A | * | 10/1998 | Gandre et al. | ......... 361/695 |
| 5,963,424 A | * | 10/1999 | Hileman et al. | ........ 361/695 |
| 6,011,689 A | * | 1/2000 | Wrycraft | ........... 361/695 |
| 6,034,870 A | * | 3/2000 | Osborn et al. | ........... 361/690 |
| 6,215,659 B1 | * | 4/2001 | Chen | ................. 361/695 |
| 6,359,781 B1 | * | 3/2002 | Hoss et al. | ............. 361/687 |
| 6,504,712 B1 | * | 1/2003 | Hashimoto et al. | ....... 361/687 |
| 6,678,157 B1 | * | 1/2004 | Bestwick | ............... 361/695 |
| 6,704,196 B1 | * | 3/2004 | Rodriguez et al. | ....... 361/687 |

OTHER PUBLICATIONS

The Article: "Processor Option Cooling Kit For personal Computers", IBM Technical Disclosure Bulletin, Nov. 1992, vol. 35, Issue 6, pp. 154-155.*

* cited by examiner

*Primary Examiner*—Michael Datskovskiy

(57) ABSTRACT

A heat dissipating system provides a fast heat dissipating airflow stream inside a desktop computer and thereby greatly enhances the heat dissipating efficiency of the desktop computer. The computer heat dissipating system includes a computer chassis which has a circular opening bored on its front plate, a motherboard which has a thermal module including a front cooling fan and a set of chipsets heatsink module installed on its top surface, and a power supply with a cooling fan. The thermal module, the chipsets heatsink module, and the power supply are aligned along a single heat dissipating airflow stream. The external low temperature air first passes through the thermal module and removes the heat generated by the central processing unit, further flows into the chipsets heatsink module and removes the heat generated by the MCH chipsets and ICH chipsets, and finally enters into the power supply and removes the heat generated by the power supply. The cooling fan of the power supply further facilitates the exhaust of the heated airflow.

7 Claims, 4 Drawing Sheets

COMPUTER HEAT DISSIPATING SYSTEM

BACKGROUND OF THE INVENTION

The present invention relates in general to a heat dissipating system for a desktop computer, and more particularly, to a heat dissipating system which is capable of forming a fast heat dissipating airflow stream inside a desktop computer and thereby greatly enhances the heat dissipating efficiency of the desktop computer.

Various electrical instruments nowadays, and especially the desktop computer, are crowded with different electrical components and peripheral devices, such as the Central Processing Unit (CPU), the interface card, the hard drive, the disk burner, and the power supply. Those electrical components and peripheral devices each generate different levels of heat during their respective operations. The CPU because of its high processing speed, in particular, generates a large amount of heat. Nonetheless, the computer chassis of the average desktop computer is closed. Accordingly, the inner temperature of a desktop computer is very high. Therefore, one or more heat dissipation modules are installed inside the computer chassis to remove the heat generated by the electrical components and peripheral devices. The removal of this generated heat helps to ensure that the inside of the computer chassis maintains a moderate operating temperature.

The conventional heat dissipation system for desktop computers nowadays has a circular opening bored in its rear plate and a corresponding cooling fan installed in that circular opening. Further, some heat dissipating modules are consisted of modules that have a heat dissipating fin and cooling fan assembled onto a high temperature electrical component. This conventional heat dissipation system is barely able to complete its work. Heat dissipation is also hindered in the conventional arts because the exhaust airflow is hindered by internal electrical components. The inner airflows created by the conventional heat dissipating system interfere with each other. This happens when some of the heated air is re-circulated into the cooling fan which is assembled on an electrical component. Some heated air re-circulates into the cooling fan assembled on an electrical component, and therefore reduces the heat transfer capability of the heat dissipating module. Furthermore, the electrical components and peripheral devices will continue to evolve and new components will need to be integrated. The current heat dissipation system is unable to satisfy the future demand of a new generation of computer systems.

BRIEF SUMMARY OF THE INVENTION

The present invention provides a heat dissipating system for a desktop computer, it is able to form a fast heat dissipating airflow stream inside a desktop computer and thereby greatly enhances the heat dissipating efficiency of the desktop computer.

The heat dissipating system for a desktop computer provided by the present invention includes a computer chassis which has a circular opening bored on the front plate thereof, a motherboard which has a thermal module including a front cooling fan and a set of chipsets heatsink module installed thereon, and a power supply with a cooling fan. The thermal module, the chipsets heatsink module, and the power supply are aligned along a single heat dissipating airflow stream. When the front cooling fan starts to operate, the external low temperature air will be drawn into the computer chassis through a plurality of vent holes of a computer bezel. The cooling airflow is directed first through the thermal module in order to remove the heat generated by the central processing unit. The cooling airflow then flows into the chipsets heatsink module and removes the heat generated by the MCH chipsets and ICH chipsets. The cooling airflow further enters into the power supply and then removes the heat generated by the power supply. The cooling fan of the power supply further facilitates the exhaust of the heated airflow.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

These as well as other features of the present invention will become more apparent upon reference to the drawings therein.

DETAILED DESCRIPTION OF THE INVENTION

Figure 1:
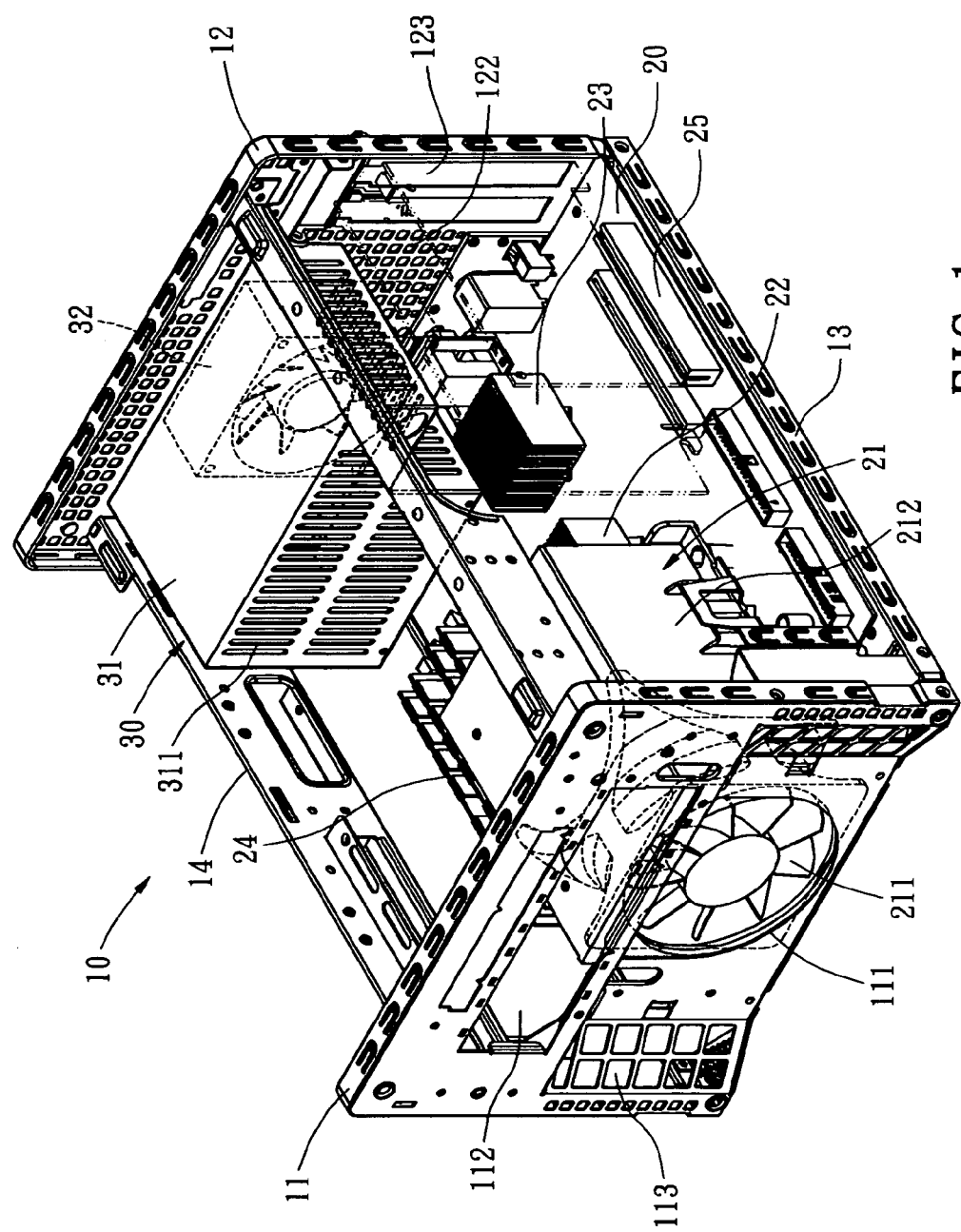
FIG. 1 is a front perspective view of a heat dissipating system for a desktop computer of the present invention.

Reference will now be made in detail to the preferred embodiments of the present invention, examples of which are illustrated in the accompanying drawings. Wherever possible, the same reference numbers are used in the drawings and the description to refer to the same or like parts.

Figure 2:
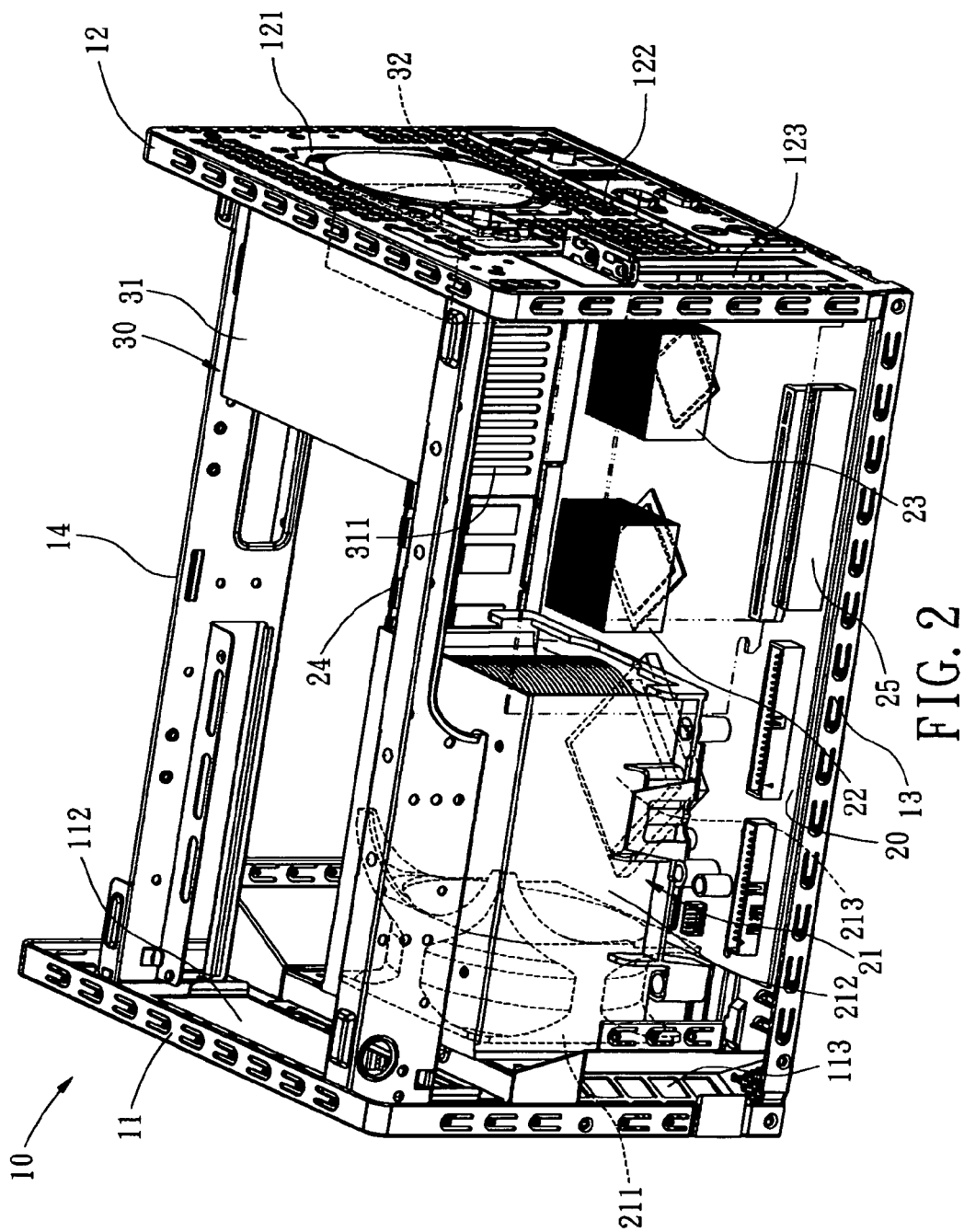
FIG. 2 is a rear perspective view of a heat dissipating system for a desktop computer of the present invention.

Referring to FIG. 1 and FIG. 2, different perspective views of a heat dissipating system for desktop computer of the present invention are shown to illustrate the heat dissipating system in a fully combined condition. The heat dissipating system includes a computer chassis 10, a motherboard 20, and a power supply 30.

The computer chassis 10 is suitable for installation of one or more high efficient central processing unit; it is constructed from a front plate 11, a rear plate 12, a bottom plate 13, and two connecting plates 14. The front plate 11 has a circular opening 111 at the central portion thereof, a rectangular opening 112 formed above the circular opening 111, and a plurality of vent holes 113 bored at both sides thereof. The rear plate 12 is disposed behind the front plate 11 and parallel to the front plate 11 with a proper distance. The rear plate 12 has an exhaust opening 121, a plurality of vent holes 122, and various slot openings 123 with different shapes. The two ends of the bottom plate 13 respectively connect to the bottom of the front plate 11 and the bottom of the rear plate 12. The connecting plates 14 are disposed parallel to the bottom plate 13 with their one end connected to the top of the front plate 11 while their other end connected to the top of the rear plate 12. The computer chassis 10 is thereby shaped into a rectangular prism.

The motherboard 20 is a flat board securely connected to the top of the bottom plate 13 of the computer chassis 10. On its top surface, the motherboard 20 is installed with a thermal module 21; a set of chipsets heatsink module which includes a first chipsets heatsink 22 and a second chipsets heatsink 23; a plurality of memory modules 24; an interface slot module 25; and other electronic elements, sockets, or connectors with various different functions. The thermal module 21 is located at the front portion of the motherboard 20, it includes a front cooling fan 211 and a processor heatsink 212 located behind the front cooling fan 211. The processor heatsink 212 is adhered to the top surface of a central processing unit 213. The front cooling fan 211 of the thermal module 21 is installed onto the corresponding circular opening 111 of the front plate 11. The chipsets heatsink module includes a first chipsets heatsink 22 and a second chipsets heatsink 23. The second chipsets heatsink 22 is located behind the first chipsets heatsink 22. In one embodiment, a Memory Controller Hub (MCH) chipsets is disposed beneath the first chipsets heatsink 22 while an Input-Output Controller Hub (ICH) chipsets is disposed beneath the second chipsets heatsink 23. In another embodiment, an ICH chipsets is disposed beneath the first chipsets heatsink 22 while a MCH chipsets is disposed beneath the second chipsets heatsink 23. The thermal module 21, the first chipsets heatsink 22, and the second chip set 23 are aligned along a single heat dissipating airflow stream channel. Further, the memory module 24 and the interface slot module 25 are respectively secured on the left side and the right side, or vice verse, of the motherboard 20 adjacent to the said heat dissipating airflow stream channel.

The power supply 30 is securely installed inside the computer chassis 10 and connected to the upper portion the rear plate 12; it includes a frame body 31, a cooling fan 32, and a transformer that is not shown in the figures. The frame body 31 has a plurality of narrow slots 311 formed on the side plates thereof. Inside the frame body 31 the transformer and the cooling fan 32 are installed. The outlet of the cooling fan 32 connects to the exhaust opening 121 of the rear plate 12. The power supply 30 is disposed behind the chipset heatsink module. The thermal module 21, the first chipsets heatsink 22, the second chip set 23, and the power supply 30 are aligned approximately along a single heat dissipating airflow stream channel.

Figure 3:
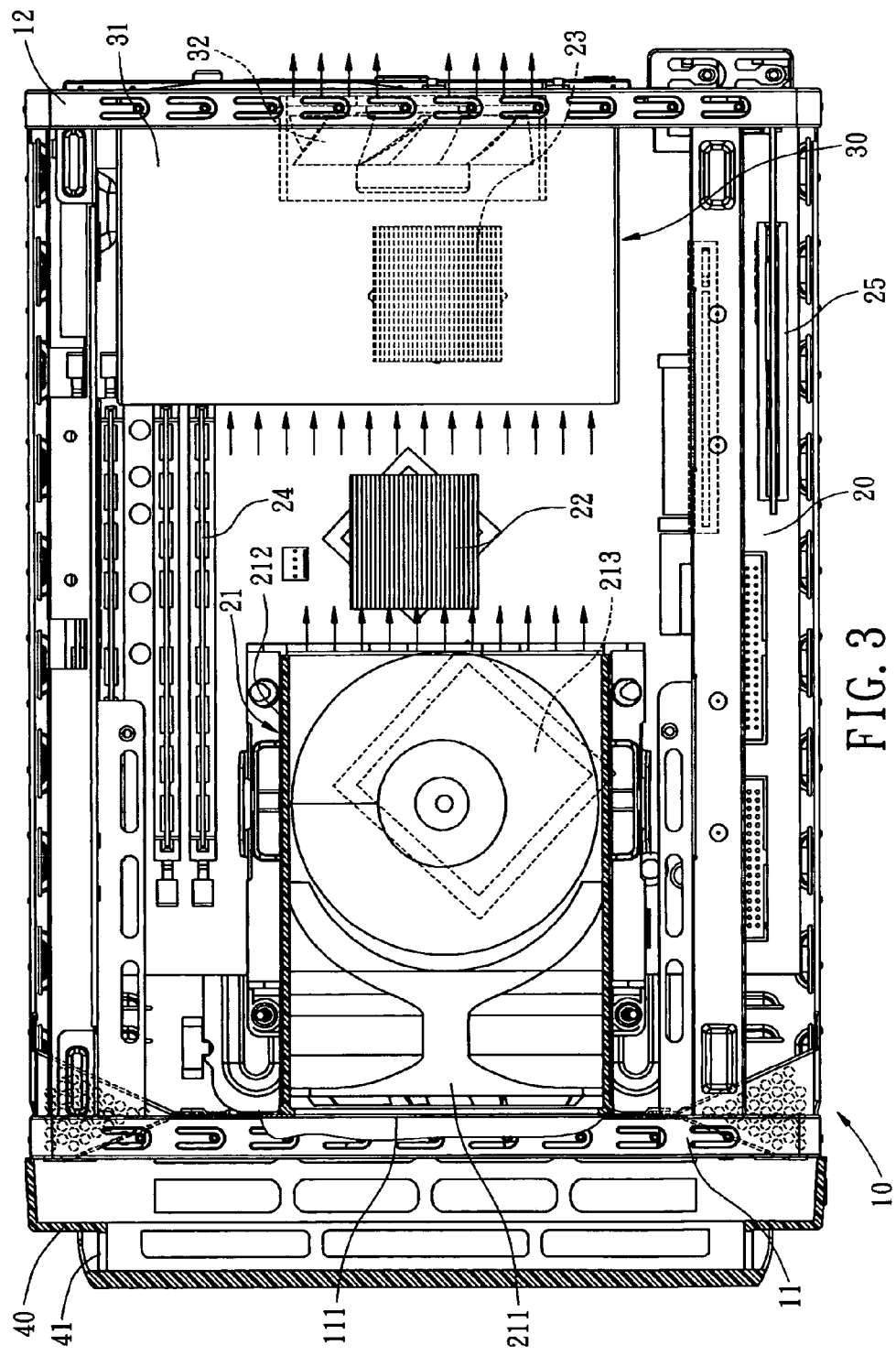
FIG. 3 is a top view of a heat dissipating system for a desktop computer of the present invention, illustrating the cooling air stream's flow direction.
Figure 4:
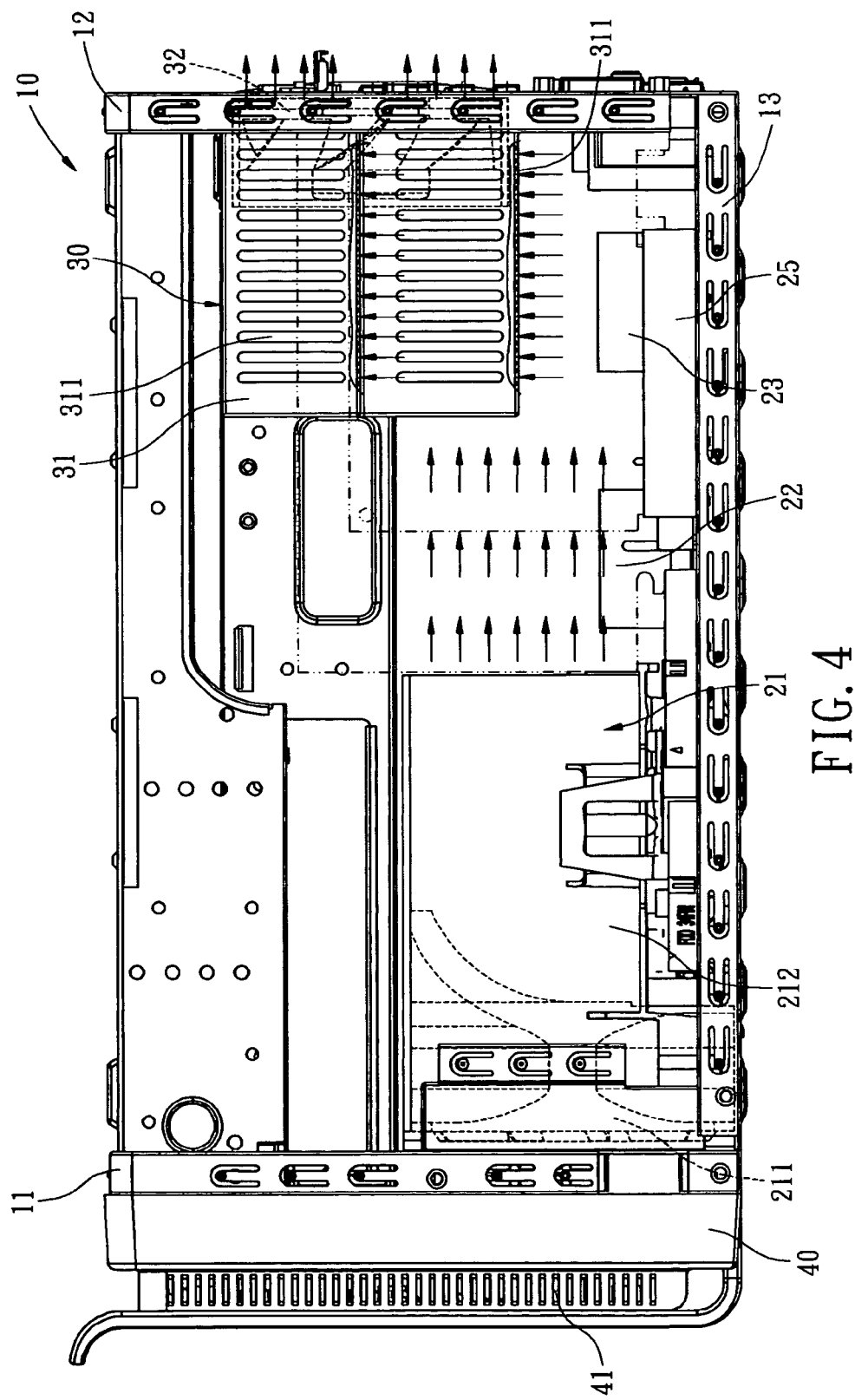
FIG. 4 is a side view of a heat dissipating system for a desktop computer of the present invention, illustrating the cooling air stream's flow direction.

Referring to FIG. 3 and FIG. 4, a top view and a side view of a desktop computer with the heat dissipating system of the present invention installed inside are shown respectively in order to illustrate the operation of the present invention. The front plate 11 of the computer chassis 10 may be capped with a computer bezel 40 which has a plurality of vent holes 41 formed thereon. When the front cooling fan 211 of the thermal module 21 starts to run, the external low temperature air will be drawn into the computer chassis 10 through the vent holes 41 of the computer bezel 40. The cooling airflow is directed first through the thermal module 21 in order to remove the heat generated by the central processing unit 213, which is the hottest component inside a desktop computer. The cooling airflow, which has passed through the thermal module 21, then flows into the chipsets heatsink module and removes the heat generated by the MCH chipsets and ICH chipsets. The cooling airflow further enters into the power supply 30 through the narrow slot 311 of the frame body 31 and then removes the heat generated by the power supply 30. The cooling fan 32 of the power supply 30 facilitates the exhaust of the heated airflow. Furthermore, because the cooling air stream flows in a fast speed, it has a drawing effect to the surrounding air. The memory module 24 and the interface slot module 25, which are respectively located at the left side or the right side of the inlet airflow stream channel, are therefore able to remove their heat through the drawing effect of the cooling air stream.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A computer heat dissipating system, comprising:
    a computer chassis which includes a front plate with a circular opening, a rear plate with an exhaust opening, and a bottom plate connected between the front plate and the rear plate;
    a motherboard installed inside the computer chassis above the bottom plate, which has a thermal module and a set of chipsets heatsink module installed thereon, the chipsets heatsink module being located behind the thermal module and closer to the rear plate, wherein the thermal module has a front cooling fan and an inlet of the front cooling fan connecting to the circular opening; and
    a power supply which is installed inside the computer chassis and connected to the rear plate, having a rear cooling fan and an outlet of the rear cooling fan connecting to the exhaust opening, wherein the thermal module, the chipsets heatsink module, and the power supply are aligned along a single heat dissipating airflow stream channel.

2. The computer heat dissipating system of claim 1, wherein the thermal module further includes a processor heatsink located behind the front cooling fan, the processor heatsink being adhered to the top surface of a central processing unit.

3. The computer heat dissipating system of claim 1, wherein the set of chipsets heatsink module includes a first chipsets heatsink and a second chipsets heatsink, the second chipsets heatsink being located behind the first chipsets heatsink.

4. The computer heat dissipating system of claim 3, wherein a Memory Controller Hub (MCH) chipsets is disposed beneath the first chipsets heatsink while an Input-Output Controller Hub (ICH) chipsets is disposed beneath the second chipsets heatsink.

5. The computer heat dissipating system of claim 3, wherein an Input-Output Controller Hub (ICH) chipsets is disposed beneath the first chipsets heatsink while a Memory Controller Hub (MCH) chipsets is disposed beneath the second chipsets heatsink.

6. The heat dissipating system for a desktop computer of claim 1, wherein the power supply includes a frame body which has a plurality of narrow slots formed on the side plates thereof.

7. The heat dissipating system for a desktop computer of claim 1, wherein the single heat dissipating airflow stream channel is directed straightly from the front plate to the rear plate.

* * * * *